J. BLANSHAN.
CAR-BRAKE.
No. 178,045.
Patented May 30, 1876.
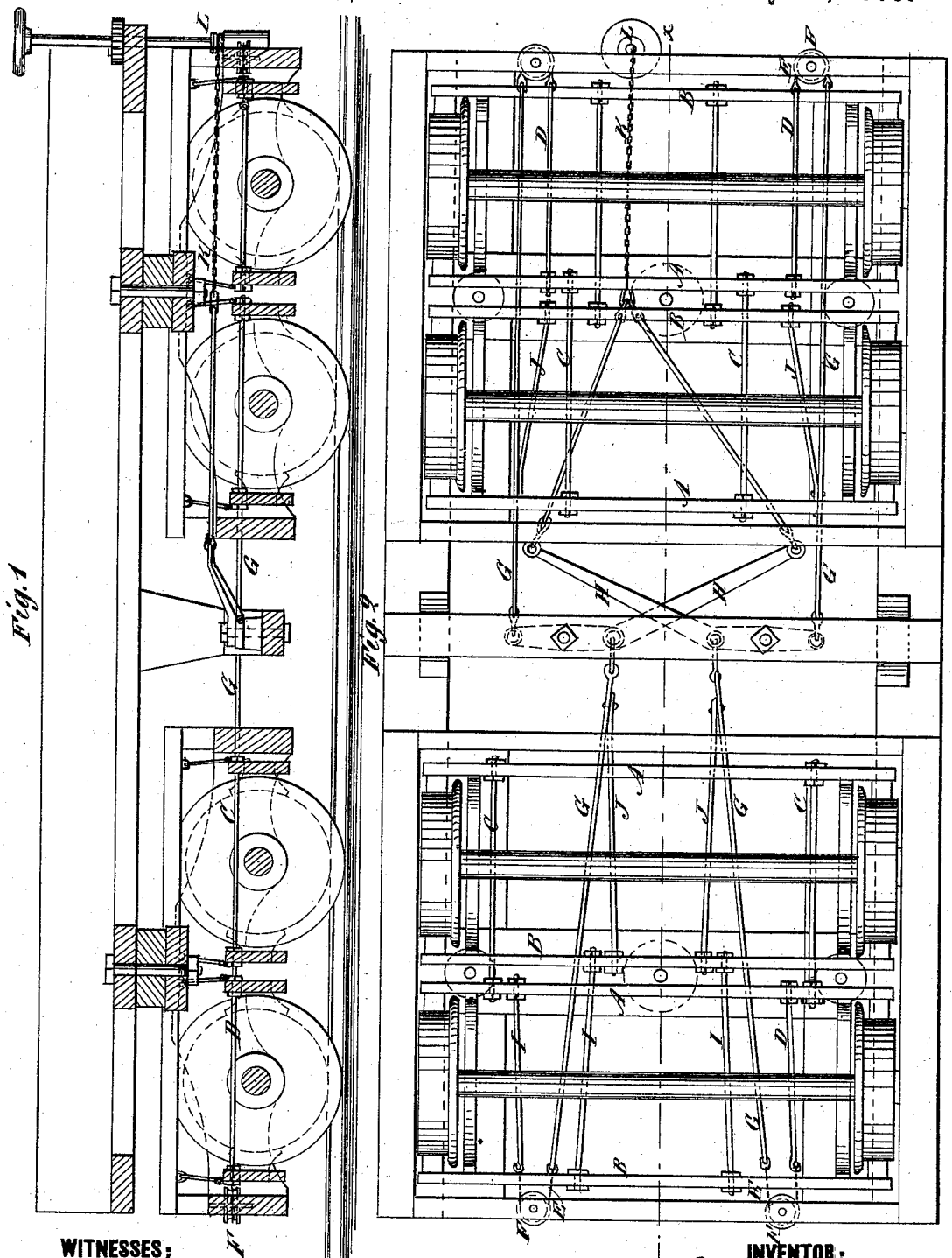
WITNESSES:
INVENTOR:

UNITED STATES PATENT OFFICE.

JACOB BLANSHAN, OF LE FEVER FALLS, NEW YORK.

IMPROVEMENT IN CAR-BRAKES.

Specification forming part of Letters Patent No. 178,045, dated May 30, 1876; application filed April 4, 1876.

*To all whom it may concern:*

Be it known that I, JACOB BLANSHAN, of Le Fever Falls, in the county of Ulster and State of New York, have invented a new and Improved Car-Brake, of which the following is a specification:

The invention relates to brakes on opposite sides of wheels; and consists in the peculiar mode of combining the parts so as to do this conveniently and effectually.

Figure 1 is a longitudinal sectional elevation of a car having my improved car-brake, the section being taken on the line $x\,x$ of Fig. 2. Fig. 2 is a plan of the car inverted.

Similar letters of reference indicate corresponding parts.

The brakes A bear on one side, say the front of the wheels, and are connected together by the rods C, so as to be operated together and alike, and they are connected to the lever H by the rods D, chains E, pulleys F, and rods G. The brakes B bear on the other sides of the wheels, say the rear, and are connected together by the rods I, and to the lever H by the rods J, thus working simultaneously with each other and with the brakes A, pressing on both sides of the wheels alike and balancing each other, so as to relieve the axles of the lateral pressure to which they are subject when the brakes apply to one side only. The brakes of both trucks are connected to the levers H at the middle of the car, the connections being on opposite sides of the pivots, so as to be worked in opposite directions by one and the same lever, and the two levers are connected by one chain, K, to the drum for working them together.

Having thus described my invention, I claim as new and desire to secure by Letters Patent—

The brakes A, connected by rods C with each other, and with the lever H by rods D, chains E, pulleys F, and rods G, in combination with opposite brakes B, connected together by rods I, and with the lever H by rods J, substantially as and for the purpose specified.

JACOB BLANSHAN.

Witnesses:
  WILLIAM LOUNSBERY,
  MELFORD VERNOOY.